(12) United States Patent
Spitzer et al.

(10) Patent No.: US 8,265,372 B2
(45) Date of Patent: *Sep. 11, 2012

(54) TEST PROCEDURE FOR MEASURING THE GEOMETRIC FEATURES OF A TEST SPECIMEN

(75) Inventors: John Spitzer, Morrisville, PA (US); Matthew Pringle, Bordentown, NJ (US); James Hubbell, Basking Ridge, NJ (US)

(73) Assignee: United States Golf Association, Far Hills, NJ (US)

( * ) Notice: Subject to any disclaimer, the term of this patent is extended or adjusted under 35 U.S.C. 154(b) by 412 days.

This patent is subject to a terminal disclaimer.

(21) Appl. No.: 12/653,222

(22) Filed: Dec. 10, 2009

(65) Prior Publication Data

US 2010/0215275 A1    Aug. 26, 2010

Related U.S. Application Data

(63) Continuation-in-part of application No. 12/380,132, filed on Feb. 24, 2009, now abandoned.

(51) Int. Cl.
*G06K 9/00* (2006.01)
*B29C 45/76* (2006.01)

(52) U.S. Cl. ..................... 382/141; 264/40.1; 264/225

(58) Field of Classification Search ............... 33/508; 264/40.1, 225; 382/100, 141; 473/324, 330, 473/331, 342, 345, 349
See application file for complete search history.

(56) References Cited

U.S. PATENT DOCUMENTS

| | | | | |
|---|---|---|---|---|
| 4,993,475 | A * | 2/1991 | Yamada | 164/340 |
| 5,377,986 | A * | 1/1995 | Viollaz et al. | 473/330 |
| 5,596,812 | A * | 1/1997 | Solheim | 33/508 |
| 5,778,966 | A * | 7/1998 | Hsieh | 164/332 |
| 7,041,005 | B2 * | 5/2006 | Beach et al. | 473/345 |
| 8,000,517 | B2 * | 8/2011 | Spitzer et al. | 382/141 |
| 2010/0212171 | A1 * | 8/2010 | Spitzer et al. | 33/508 |
| 2010/0215275 | A1 * | 8/2010 | Spitzer et al. | 382/195 |

* cited by examiner

*Primary Examiner* — R. A. Smith
(74) *Attorney, Agent, or Firm* — Francis C. Hand; Carella, Byrne Et Al

(57) ABSTRACT

The test procedure for measuring a geometric feature of a test specimen employs a replicating compound to obtain a casting with a negative image of the geometric feature followed by forming a protective covering over the casting from a replicating compound having a contrasting color. The casting and protective covering unit is cut to obtain a test piece and a flat bed scanner is used to scan the profile of the test piece and obtain an electronic two-dimensional image of the profile for analysis.

9 Claims, 2 Drawing Sheets

TEST PROCEDURE FOR MEASURING THE GEOMETRIC FEATURES OF A TEST SPECIMEN

This is a Continuation-in-Part of Ser. No. 12/380,132 filed Feb. 24, 2009 now abandoned.

This invention relates to a test procedure for measuring a geometric feature of a test specimen.

It is often required, as part of quality assurance and process control, that accurate measurements be made of the surface of components such as machined and cast mechanical and electrical parts. In addition, the inspection of failed components often requires the measurement of the form of the failed components. Various contact and non-contact methods may be employed to make such measurements.

For example, U.S. Pat. No. 7,583,386 describes a system to measure defects on a surface of a wafer and an edge of the wafer using a radial motor to move an optical head in a radial direction to detect defects at locations displaced from the edge of the wafer, and a rotational motor to rotate the optical head around the edge of the wafer to detect defects on the edge of the wafer. U.S. Pat. No. 7,518,733 describes a surface profiling apparatus that employs light that is reflected by a sample surface. U.S. Pat. No. 6,401,349 describes a surface measuring apparatus that employs a stylus mounted on a pivotal support arm to determine surface measurements. U.S. Pat. No. 5,814,722 employs surface metrology to determine the characterization and quantification of surface textures and/or features.

Generally, these known techniques for measuring geometric features are usually very expensive and require skilled operators working in clean room environments.

Accordingly, it is an object of the invention to provide an inexpensive test procedure for measuring the geometric features of a test specimen.

It is another object of the invention to provide an accurate and precise system for measuring the geometric features of a test specimen.

It is another object of the invention to provide a portable system for measuring the geometric features of a test specimen that can be transported directly to a shop floor.

Briefly, the invention provides a test procedure for measuring a geometric feature of a test specimen by obtaining and measuring an electronic image of a replica of the geometric feature employing two replicating compounds of contrasting color to produce the replica.

In order to obtain a replica of the geometric feature of the test specimen, a first replicating compound, i.e. a casting compound, is applied to a surface of the test specimen and maintained on the surface for a time sufficient for the compound to cure into a self-supporting casting having a negative impression of the surface. Thereafter, the casting is removed from the surface of the test specimen and a second replicating compound, i.e. a casting compound, of a contrasting color to that of the first casting compound is applied over the negative impression on the casting. This second casting compound is allowed to cure into a protective covering on the negative impression on the casting while forming a positive impression in the covering as a negative image of the negative impression on the casting.

Thereafter, the casting having the protective covering thereon is cut in a plane corresponding to a surface of interest of the test specimen such that the plane of interest is parallel to the cutting mechanism of a cutting or slicing apparatus and such that a test piece is obtained. The cut side of the test piece thus presents a profile characterised by showing a casting layer and a covering layer sandwiching the respective negative impression and positive impression therebetween. The sandwiched together impressions thus provide two replicas of the geometric feature of the surface of the test specimen at the point of cutting, i.e. the impression in the casting layer is a negative replica while the impression in the covering layer is a positive replica of the surface of interest.

The replica of the surface of interest may be inspected either directly (using a microscope for example), or imaged using digital imaging technologies. The digital image may be further analyzed either manually or using image recognition techniques described in the previous parent applications to extract the two dimensional profile co-ordinates.

In order to obtain and measure an electronic image of the desired replica, a flatbed scanner is used to scan the profile of the test piece to form an electronic two-dimensional image of the profile of the test piece.

The use of a flatbed scanner offers several advantages over a digital camera system. A digital camera collects images on a two dimensional sensor. The aspect ratio of the sensor typically ranges from 1:1 to 1.5:1. Currently, pixel sizes are limited to approximately 125 µin on a sensor having a width of approximately 0.375". Therefore, using a digital camera becomes a compromise between resolution and field of view. The flatbed scanner has no such limitation; the highest resolution can be used over the entire scanning area, typically at least 8.5"×11". As a direct consequence of this compromise, for example, it is possible on a flatbed scanner to simultaneously measure macroscopic profile features and microscopic surface roughness. This is not possible on a digital camera based system. Finally, the flatbed scanner aspect ratio can be optimized to the casting being scanned improving image storage efficiency.

Thereafter, a negative image of the profile from the electronic image is formed as a replica of the surface of the test specimen corresponding to the location of the test piece in the test specimen. This step may be performed by converting the electronic image from grayscale to a black and white image by setting all pixels with intensity level less than or equal to the threshold level to 0 (black) and pixels with intensity levels greater than the threshold to 1 (white). The threshold may be in the range or 0 to 1, preferably 0.25 to 0.75 and most preferably 0.55. The profile of the replica is the boundary between the black and white regions of the image.

In addition to arbitrarily setting the threshold, it is possible (and may be even preferable) to employ an automated threshold algorithm to determine the optimum pixel intensity to convert a gray scale image to black and white. For example, Otsu's method may be employed which chooses the threshold to minimize the intraclass variance of the thresholded black and white pixels.

This negative image is then measured or analyzed to determine parameters of interest, such as, important dimensions, radius of curvature, flatness, surface roughness, comparison of specimen form to design limits and the like. Other analyses may include:

Point measurement: Point, peak, contact, intersection, bisector-point (between elements/pieces of measured data)

Line measurement: Line, tangent line, perpendicular, parallel line, bisector

Circle measurement: Circle (multi-point, range, center and radius)

Position, difference: Coordinate difference, true position judgment

Distance, angle: Distance, groove length, step, pitch, distance reference, angle Coordinate system setup: Origin setup, coordinate system rotation Calculation, statistics: Arithmetic calculation, absolute value, square root, maximum value, minimum value, mean, sum, standard deviation, unbiased standard deviation, area Editing of measured points: Deletion, translation, rotation, mirror image, positioning, combination, separation, projection Nominal data creation: Function specification (line/circle/aspheric surface, etc.), CAD input (IGES, DXF), measured data conversion, text file conversion Tolerancing direction setting: Normal direction, X-axis direction, Z-axis direction Reference coordinate system translation/rotation Best-fit: X-axis translation, Z-axis translation, rotating direction, several kinds in combination Nominal value tolerancing Results display: Result list display, graphic display External output of files: Analysis results can be output in the CSV format, and therefore, can be easily accessed by commercial spreadsheet software. Also, measured data (point group data) can be output in the ASCII code.

Polar coordinate development display: Develops a circular form on to the polar coordinate system, where the range for circle calculation can be specified.

The profile may also be exported to a format suitable for use in computer aided design (CAD) software for further manual analysis.

Further, the casting and protective covering may be cut at multiple locations to provide a plurality of cross sections, all of which can be imaged and analyzed for the purpose, for example, of determining variation in the dimensions or the fidelity of the measurements.

These and other objects and advantages of the invention will become more apparent from the following detailed description taken in conjunction with the accompanying drawings wherein.

Figure 1:
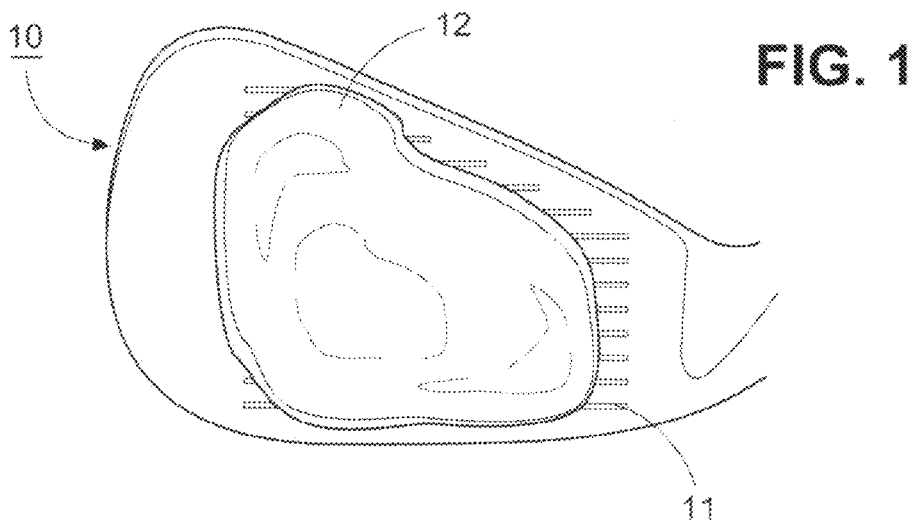
FIG. 1 illustrates a perspective view of a test specimen with grooves and a casting compound thereon in accordance with the invention.

Referring to FIG. 1, after the surface of interest of a test specimen 10 has been cleaned, a curable casting or replicating compound is applied to the surface. The test specimen 10 may be a golf club and the surface of interest may be the grooves 11 in the face of the golf club, for example as described in the parent application.

The replication compound may also be as described in the parent application.

Figure 2:
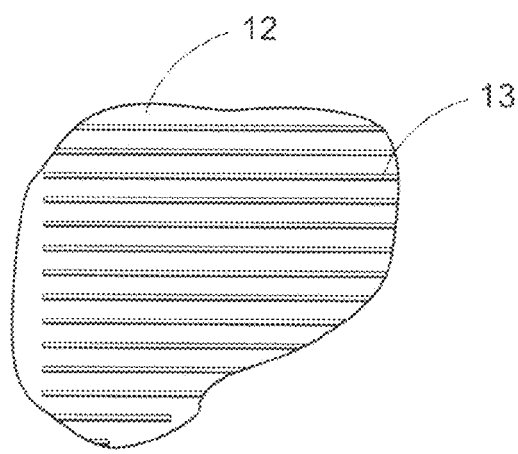
FIG. 2 illustrates a plan view of the underside of the cured compound (casting) after removal from the test specimen of FIG. 1.

The casting compound is maintained on the surface of interest for a time sufficient for the compound to cure into a self-supporting casting 12 having a negative impression of the surface of interest. After curing, the compound is peeled from the golf club as self-supporting casting 12. As indicated in FIG. 2, this casting 12 has a plurality of ribs 13 on the underside that are a replica of the grooves 11 of the golf club face 10. Likewise, when the casting has been formed from any other test specimen, the underside of the casting has a negative impression of the surface of interest of the test specimen.

Figure 3:
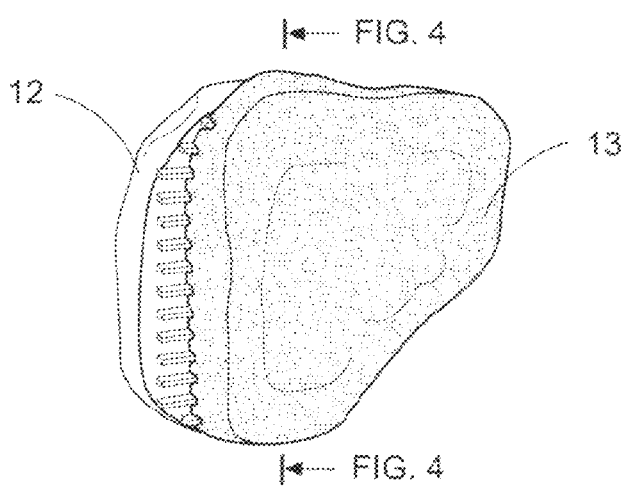
FIG. 3 illustrates a perspective view of the casting with a protective layer thereon in accordance with the invention.

Referring to FIG. 3, the casting 12 is thereafter oriented to a second casting compound of like composition but of a contrasting color to that of the first casting compound to form a protective covering on the negative impression on the casting. For example, the casting 12 is turned over and the second casting compound is poured over the negative impression on the casting. Alternatively, the casting 12 may be dipped into the second casting compound.

The second casting compound is allowed to cure into a protective covering 13 on the negative impression on the casting 12 while forming a positive impression in the covering 13 as a negative image of the negative impression on the casting 12.

Figure 4:
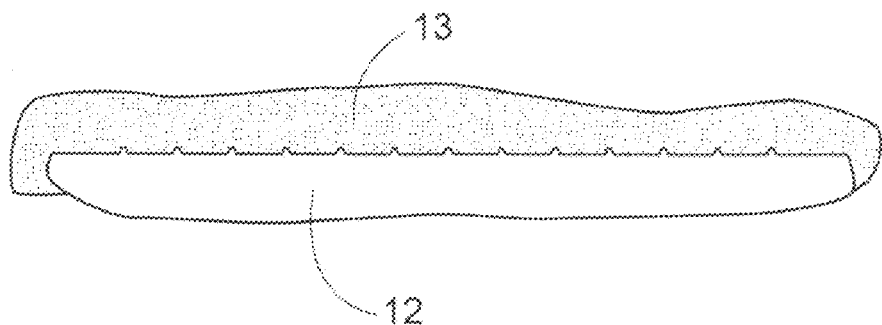
FIG. 4 illustrates a cross-sectional view of the casting and protective layer unit through a plane corresponding to the surface of interest of the test specimen.

Thereafter, the casting 12 having the protective covering 13 thereon is cut such that the plane of interest is parallel to the cutting mechanism of a cutting or slicing apparatus and such that a test piece is obtained having a cross-section as shown in FIG. 4. The cut side of the test piece thus presents a profile characterised by showing a casting layer 12 and a covering layer 13 sandwiching the respective negative impression and positive impression therebetween. The sandwiched together impressions thus provide two replicas of the geometric feature of the surface of the test specimen at the point of cutting, i.e. the impression in the casting layer is a negative replica while the impression in the covering layer is a positive replica of the surface of interest.

A flatbed scanner then scans the profile of the test piece to form an electronic two-dimensional image of the profile of the test piece.

Figure 5:
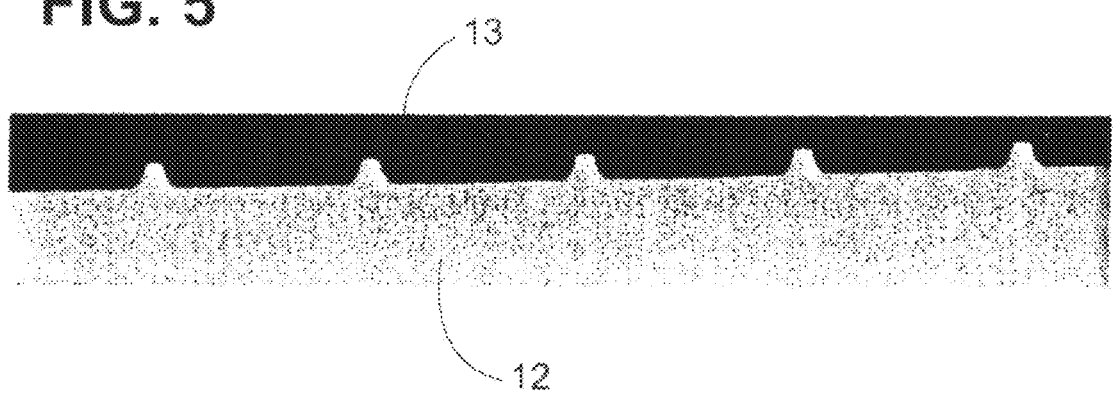
FIG. 5 illustrates an electronic image of the cross-section of FIG. 4.

Thereafter, as described in the parent application, a negative image of the profile from the electronic image is formed, as shown in FIG. 5, as a replica of the surface of the test specimen corresponding to the location of the test piece in the test specimen wherein the casting layer 12 is on the bottom, as viewed, and the covering layer 13 is on top. This step may be performed by converting the electronic image from grayscale to a black and white image by setting all pixels with intensity level less than or equal to the threshold level to 0 (black) and pixels with intensity levels greater than the threshold to 1 (white). The threshold may be in the range or 0 to 1, preferably 0.25 to 0.75 and most preferably 0.55. The profile of the replica is the boundary between the black and white regions of the image.

In addition to arbitrarily setting the threshold, it is possible (and may be even preferable) to employ an automated threshold algorithm to determine the optimum pixel intensity to convert a gray scale image to black and white. For example, Otsu's method may be employed which chooses the threshold to minimize the intraclass variance of the thresholded black and white pixels.

Figure 6:
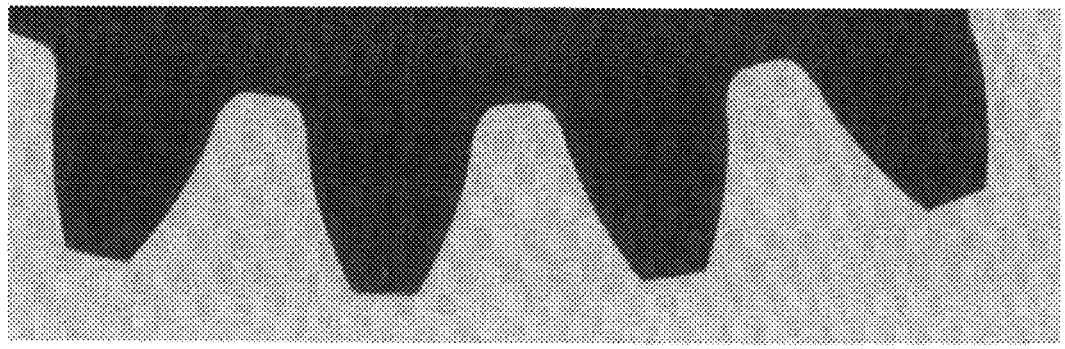
FIG. 6 illustrates a negative image of an electronic image of a section of a test piece obtained from a toothed gear.

Referring to FIG. 6, the test specimen may be a toothed gear and the surface of interest may be the grooves of the gear. In this case, the first casting compound is applied to the gear to obtain a negative impression of the gear teeth of a given section of the gear. After curing and removal of the casting, the second casting compound is applied over the negative impression of the casting and cured to form a protective coating. The resulting casting and coating may then be cut to obtain a test piece that is then scanned on a flat bed scanner to obtain an electronic image.

Thereafter, a negative image of the electronic image is obtained, as shown in FIG. 6.

As above, the boundary between the black and white regions of the image of FIG. 6 represents the profile of the grooves and teeth of the gear and can be measured and compared to a standard for conformance with the standard.

The invention thus provides a technique that can be used to measure the geometric features of any test specimen capable of being replicated by a replicating compound as described above. For example, the geometric feature may be any one of flatness, roundness, distances of profile features, angles of features, radius of curvature, deviations from an ideal form, comparisons between two similar parts, surface roughness and the like.

What is claimed is:

1. A test procedure to measure a test specimen comprising the steps of
  applying a first casting compound to a surface of a test specimen;
  maintaining the casting compound on said surface for a time sufficient for the compound to cure into a self-supporting casting having a negative impression of said surface;
  removing the casting from said surface of the test specimen;
  applying a second casting compound of a contrasting color to that of the first casting compound over the negative impression on the casting;
  allowing the second casting compound to cure into a protective covering on the negative impression on the casting while forming a positive impression in the covering as a negative image of the negative impression on the casting;
  cutting the casting and protective layer thereon in a plane corresponding to a surface of interest of said test specimen to obtain a test piece having a profile characterised by showing a casting layer and a covering layer sandwiching the negative impression therebetween; and
  measuring the negative impression in the casting to determine the geometric feature of said surface of the test specimen corresponding to said plane of cutting.

2. A test procedure as set forth in claim 1 wherein said step of cutting includes cutting the casting and the protective covering thereon such that the plane of interest is parallel to the cutting mechanism of a cutting or slicing apparatus.

3. A test procedure as set forth in claim 1 further comprising the steps of scanning said test piece on a flatbed scanner to form an electronic two-dimensional image of the profile of said test piece; obtaining a negative image of said electronic image as a replica of the surface of said test specimen corresponding to the location of said test piece in said test specimen; and measuring said negative image to determine conformance of said replica with a predetermined standard.

4. A test procedure to measure a test specimen comprising the steps of
  applying a first casting compound tea surface of a test specimen;
  maintaining the casting compound on said surface for a time sufficient for the compound to cure into a self-supporting casting having a negative impression of said surface;
  removing the casting from said surface of the test specimen;
  applying a second casting compound of a contrasting color to that of the first casting compound over the negative impression on the casting;
  allowing the second casting compound to cure into a protective covering on the negative impression on the casting while forming a positive impression in the covering as a negative image of the negative impression on the casting;
  cutting the casting having the protective covering thereon to obtain a test piece;
  scanning said test piece on a flatbed scanner to form an electronic two-dimensional image of the profile of said test piece;
  obtaining a negative image of said electronic image as a replica of the surface of said test specimen corresponding to the location of said test piece in said test specimen; and
  measuring said negative image to determine conformance of said replica with a predetermined standard.

5. A test procedure as set forth in claim 4 wherein said step of obtaining a negative image includes converting said electronic image from grayscale to a black and white image by setting all pixels with intensity level less than or equal to a threshold level to 0 (black) and pixels with intensity levels greater than the threshold to 1 (white).

6. A test procedure as set forth in claim 5 wherein said threshold is in the range of from 0 to 1.

7. A test procedure as set forth in claim 5 wherein said threshold is in the range of from 0.25 to 0.75.

8. A test procedure as set forth in claim 5 wherein said threshold is 0.55.

9. A test procedure as set forth in claim 5 wherein said step of measuring said black and white image measures the boundary between the black and white regions of said black and white image.

* * * * *